US012009618B2

(12) United States Patent
Eiler

(10) Patent No.: US 12,009,618 B2
(45) Date of Patent: Jun. 11, 2024

(54) PLUG CONNECTION WITH BACKLASH-FREE PRELOAD

(71) Applicant: HIRSCHMANN AUTOMOTIVE GMBH, Rankweil/Brederis (AT)

(72) Inventor: Simon Eiler, Rankweil (AT)

(73) Assignee: HIRSCHMANN AUTOMOTIVE GMBH, Rankweil/Brederis (AT)

( * ) Notice: Subject to any disclaimer, the term of this patent is extended or adjusted under 35 U.S.C. 154(b) by 0 days.

(21) Appl. No.: 17/769,762

(22) PCT Filed: Nov. 24, 2020

(86) PCT No.: PCT/EP2020/083236
§ 371 (c)(1),
(2) Date: Apr. 18, 2022

(87) PCT Pub. No.: WO2021/105135
PCT Pub. Date: Jun. 3, 2021

(65) Prior Publication Data

US 2022/0393396 A1 Dec. 8, 2022

(30) Foreign Application Priority Data

Nov. 25, 2019 (DE) ..................... 10 2019 131 725.8

(51) Int. Cl.
*H01R 13/62* (2006.01)
*H01R 13/627* (2006.01)
*H01R 13/629* (2006.01)

(52) U.S. Cl.
CPC ... *H01R 13/6271* (2013.01); *H01R 13/62938* (2013.01)

(58) Field of Classification Search
None
See application file for complete search history.

(56) References Cited

U.S. PATENT DOCUMENTS 6,315,585 B1 11/2001 Weiss
8,133,065 B2 * 3/2012 Horiuchi .......... H01R 13/62938 439/157
2020/0244007 A1 7/2020 Weiss

* cited by examiner

*Primary Examiner* — Ross N Gushi
(74) *Attorney, Agent, or Firm* — Andrew Wilford

(57) ABSTRACT

Plug-in connection, comprising a plug-in connector (1) which can be plugged together with a mating plug-in connector, also known as a pin housing (2), it being possible to at least indirectly lock the plug-in connector (1) with the mating plug-in connector (2), characterised in that a bushing housing (3) is provided which at least partially surrounds the plug-in connector (1) and provides the locking with the mating plug-in connector or pin housing (2), and in that the plug-in connector (1), the mating plug-in connector or the pin housing (2) and the bushing housing (3) are operatively interconnected by means of a lever mechanism and can be braced together.

5 Claims, 1 Drawing Sheet

3. Sleeve latched when end position reached

1. Sleeve mounted on the mating conductor part

2. Sleeve-carrying mating conductor part is in end position (mating conductor part in contact with the main-conductor part base.

3. Sleeve latched when end position reached

PLUG CONNECTION WITH BACKLASH-FREE PRELOAD

CROSS REFERENCE TO RELATED APPLICATIONS

This application is the US-national stage of PCT application PCT/EP2020/083236 filed 24 Nov. 2020 and claiming the priority of German patent application 102019131725.8 itself filed 25 Nov. 2019.

FIELD OF THE INVENTION

The invention relates to a plug connection comprising a main connector that can be plugged together with a mating connector also referred to as a pin housing, the main connector being latched at least indirectly to the mating connector.

BACKGROUND OF THE INVENTION

Such plug connections are generally known. In these plug connections, there is the problem of play between the main connector and the mating connector, permitting relative movement between the main connector and the mating connector while increasing the transition resistance.

OBJECT OF THE INVENTION

The object of the invention is to improve a plug connection of the above-described type such that the latch play is eliminated or greatly reduced, the transition resistance does not change, and no contact abrasion takes place in the vibration-loaded insert.

SUMMARY OF THE INVENTION

According to the invention, a sleeve is provided that at least partially surrounds the main connector and effects the latching with the mating connector or pin housing, and in that the main connector, mating connector or pin housing and the sleeve are operatively connected to one another by a lever mechanism and can be braced against one another. As a result of this configuration, the plug connection can be pre-tensioned substantially more forcefully than is normally possible by the applied assembly force. The lever mechanism increases the prestressing force, and the high prestressing forces are also made possible in the case of plug connections that are mounted manually.

An end stop is preferably provided on the sleeve and/or on the main connector to limit displacement of the sleeve on the main connector toward the pin housing.

According to the invention, the lever mechanism has a lever that is fixed in a central region so as to be pivotable on the main connector and is connected with its two ends to the pin housing and to the sleeve. The lever has at one end a pin that, after insertion into a slot of the sleeve or of the pin housing, is displaceably guided therein. The lever also has a slot at the other end that engages around the pin after insertion of a pin fastened to the pin housing or sleeve.

In order to prevent the latching play and to improve the prestress, a spring, preferably a leaf spring, is provided on the edge of the slot facing the pin housing that spring biases the pin housing toward the main connector and at the same time clamps the plug connection.

BRIEF DESCRIPTION OF THE DRAWING

The invention is described below with reference to the drawing in which an embodiment of the invention is illustrated in a simplified manner. Therein.

SPECIFIC DESCRIPTION OF THE INVENTION

Figure 1:
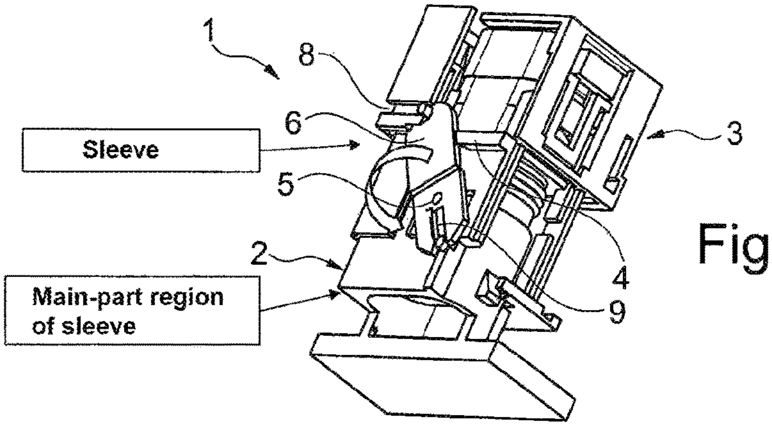
FIG. 1 is a perspective view of the plug connection at the start of contacting.
Figure 2:
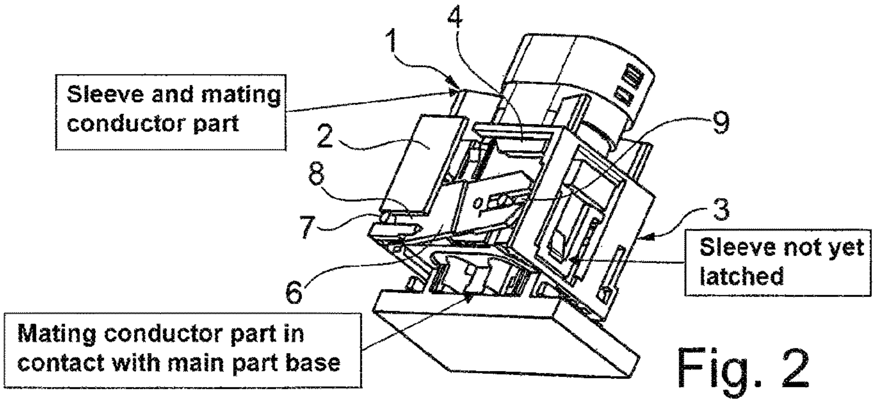
FIG. 2 shows the plug connection after joining the main plug connector to the mating plug connector.
Figure 3:
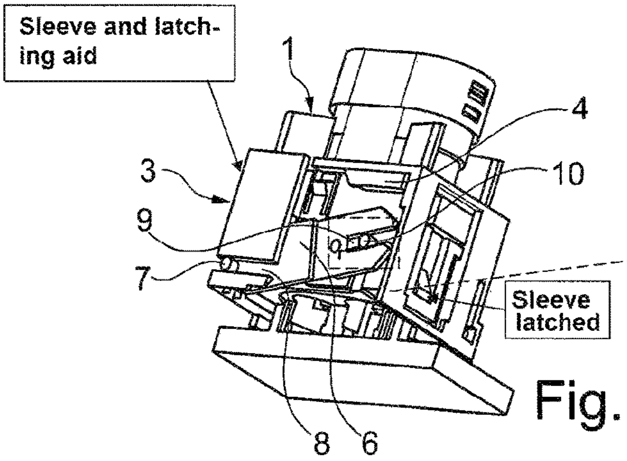
FIG. 3 shows the plug connection according to FIG. 2 with the sleeve latched on the mating connector.
Figure 4:
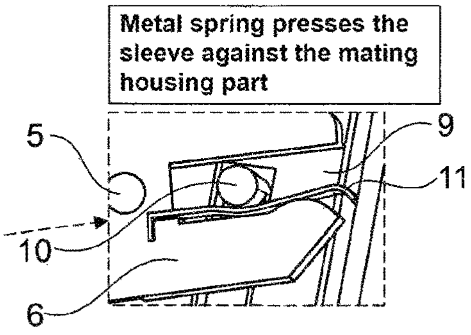
FIG. 4 is a large-scale view the lever with a built-in spring.

In FIGS. 1 to 4, reference numeral designates a main connector 1 that contacts a mating connector or pin housing 2 and thereby establishes an electrical connection. A sleeve shown at 3 is displace on the main plug connector 1. A lug 4 on the main connector 1 forms a stop that limits displacement of the sleeve 3 on the main connector 1 toward the pin housing 2.

The main connector 1 has a pivot 5 on which a lever 6 is mounted. At its one end, the lever 6 has a pin 7 that fits in and slides along a slot 8 of the sleeve 3. A slot 9 formed on the other end of the lever 6 fits with a pin 10 on the mating connector or pin housing 2.

At the start of contacting, both the pin 7 and the pin 10 engage in the respective slots 8 and 9, so that a lever action is generated by a force acting on the sleeve 3 toward the pin housing 2, which lever action draws or pushes the main connector 1 and the mating connector or pin housing 2 toward each other. As soon as the sleeve 3 reaches the lug 4 on the main connector 1, the contacting is completed and the sleeve 3 engages with a tab behind a ramp on the mating connector or pin housing 2.

The increase in the clamping force and permanent bracing between the main connector 1 and the mating connector or pin housing 2 is aided by a spring 11 that is installed on the edge of the slot 10 in the lever and is designed as a leaf spring. The bracing is permanently possible because the other end of the lever 6 is supported via the sleeve 3 and the sleeve 3 in turn is fixed to the mating plug connector or pin housing 2 via the latch.

There are at least one here unillustrated mating contact partner in the main connector 1 as well as in the mating connector 2 or pin housing that together form an electrical connection when the main connector 1 has been plugged together in the manner described above with the mating connector 2 or the pin housing.

The at least one contact partner of the main connector 1 and/or the at least one mating contact partner of the mating connector 2 or of the pin housing are mounted, for example, at the end of a respective cable, but can also be arranged on a board of an electronic device or the like.

The invention claimed is:

1. A plug connection comprises:

a main connector;

a mating connector latchable at least indirectly to the mating connector;

a sleeve at least partially engaged around the main connector and at least indirectly latchable to the mating connector, the sleeve or the mating connector being formed with a slot;

a lever having ends of which one carries a pin that after insertion into the slot is movable therein, the lever operatively connecting the main connector, the mating connector, and the sleeve to one another thereby bracing the sleeve and connectors against each other; and a spring on the lever at an edge of the slot facing the mating connector and biasing the mating connector toward the main connector.

2. The plug connection according to claim 1, further comprising:

an end stop on the sleeve and/or on the main connector and limiting displacement of the sleeve on the main connector toward the mating connector.

3. The plug connection according to claim 1, wherein the lever is fixed in a central region so as to be pivotable on the main connector and is connected with its ends to the mating connector and the sleeve.

4. The plug connection according to claim 1, wherein the lever has at its other end a slot that, after insertion of a pin on the mating conductor or on the sleeve, engages around the latter.

5. The plug connection according to claim 1, wherein the spring is a leaf spring.

* * * * *